United States Patent
Kadar-Kallen

(10) Patent No.: US 8,908,299 B2
(45) Date of Patent: Dec. 9, 2014

(54) MOLDED OPTICAL COMPONENT WITH INSPECTION FEATURES

(75) Inventor: Michael Aaron Kadar-Kallen, Harrisburg, PA (US)

(73) Assignee: Tyco Electronics Corporation, Berwyn, PA (US)

( * ) Notice: Subject to any disclaimer, the term of this patent is extended or adjusted under 35 U.S.C. 154(b) by 0 days.

(21) Appl. No.: 13/415,037

(22) Filed: Mar. 8, 2012

(65) Prior Publication Data
US 2013/0235480 A1    Sep. 12, 2013

(51) Int. Cl.
*G02B 6/38*    (2006.01)

(52) U.S. Cl.
CPC .............. *G02B 6/3853* (2013.01); *G02B 6/383* (2013.01)
USPC ................................ 359/811; 385/61; 385/52

(58) Field of Classification Search
CPC .......... G02B 6/32; G02B 6/322; G02B 6/325; G02B 6/3853; G02B 6/383
USPC .................. 264/1.1–2.7; 65/37, 39, 406, 407; 385/52, 60, 61, 72, 78, 79; 425/808; 359/900
See application file for complete search history.

(56) References Cited

U.S. PATENT DOCUMENTS

| 6,371,658 B2* | 4/2002 | Chong ............................ 385/59 |
| 6,838,689 B1 | 1/2005 | Deng et al. | |
| 2006/0068629 A1 | 3/2006 | Nakajima | |
| 2009/0116793 A1 | 5/2009 | Nishimura et al. | |
| 2011/0228259 A1* | 9/2011 | Duis et al. ..................... 356/73.1 |
| 2012/0033921 A1* | 2/2012 | Haley et al. ..................... 385/78 |

FOREIGN PATENT DOCUMENTS

| EP | 0488633 A2 | 6/1992 |
| EP | 1031859 A1 | 8/2000 |
| EP | 1857849 A1 | 11/2007 |
| JP | 2000121873 A | 4/2000 |

OTHER PUBLICATIONS

International Search Report, International Application No. PCT/US2013/029476, International Filing Date Mar. 7, 2013.

* cited by examiner

*Primary Examiner* — Darryl J Collins
*Assistant Examiner* — Gary O'Neill

(57) ABSTRACT

A method of tuning a mold for an optical component, the method comprising: (a) molding an optical component comprising at least: (i) a body portion defining a first face; (ii) at least one optical element on the first face, the optical element having a certain geometry; (iii) at least one alignment element on the first face selected from one of an alignment hole or an alignment pin; and (iv) at least one inspection element in a position fixed relative to the at least one alignment element on the first face; (b) measuring the location of the inspection element on the front face relative to the optical element; (c) comparing the location to a standard to determine a difference; and (d) if the difference is significant, adjusting a component of the mold to change the location of the alignment element relative to the optical element and reiterating steps (a)-(c).

20 Claims, 1 Drawing Sheet

MOLDED OPTICAL COMPONENT WITH INSPECTION FEATURES

FIELD OF INVENTION

The present invention relates generally to molded optical components, and, more specifically, to a molded optical component having inspection features to facilitate adjustment of the mold used to form it.

BACKGROUND OF INVENTION

Applicants have recently molded lensed ferrules comprise an array of lenses and one or more mechanical alignment elements. The lenses are typically in a linear array with a pitch of 0.25 mm and a diameter slightly less than 0.25 mm, for example, 0.24 mm. The alignment elements are typically pins and/or holes with a diameter of 0.7 mm. In one embodiment, the ferrules are hermaphroditic, meaning that a given ferrule has an alignment pin and an alignment hole such that identical ferrules can mate with one another.

It is critical to the performance of the lensed ferrule that the lenses be precisely located with respect to the mechanical alignment elements. For example, when two lensed ferrules are mated to each other, the mechanical alignment elements guide the two parts such that the corresponding lenses will be aligned. Any deviation from this alignment will result in increased loss, and possible loss of function of the optical device. Therefore a molded part should be formed that has a precise relationship between the locations of the mechanical alignment elements and the optical components (lenses, fibers, etc.).

When creating such molded components, the mold is typically built from several pieces of mold "steel," which can be adjusted slightly as the mold is "conditioned" or tuned. The mold is typically inspected for accuracy. However, the molded part must meet optical and therefore dimensional tolerances. The final conditioning of the mold is therefore made by inspecting molded pieces and adjusting the mold accordingly. Acceptance of the mold is based on a "first article" inspection of the molded pieces, which consists of a measurement of all dimensions on the product based on several representative pieces. For these reasons, it is necessary to be able to accurately measure the locations of the optical and mechanical elements of a molded component.

Accurate measurements of a molded part can be made visually, using a camera, lens system, and precision translation stages. However, because the dimensions and geometries of the lenses and mechanical alignment elements are significantly different, Applicant recognizes that a measurement of the relative locations of the lenses and mechanical alignment elements can be difficult. For example, systematic errors may be introduced by lighting, which may affect one geometry, such as a lens, in a different manner than it affects another geometry, such as a hole.

Furthermore, Applicant recognizes that the edges of a molded part are often not perfectly sharp. For example, the material being molded may not fill the corners of the mold. Also, it may not be possible to machine sharp corners for some elements of the mold, thereby resulting in rounded edges in the molded plastic part. In this respect, some edges are even configured to be rounded—e.g., alignment pins are typically configured with a chamfered edge to function as a lead in when the alignment pin is inserted into an alignment hole during mating. Because rounded edges are not clearly defined, they complicate accurate visual measuring of the molded part.

For example, referring to FIGS. 1-2, a hermaphroditic ferrule 100 is shown which uses pin/hole alignment elements 104, 105 to align mating ferrules. The ferrule 100 comprises a linear array of lenses 103. Such a part is particularly difficult to inspect visually as shown in FIG. 2. The pin 104, hole 105, and lenses 103 all have a different characteristic appearance, which depends significantly on the lighting conditions. The edge of the alignment pin 104 is particularly hard to determine, since it has a fillet 104a to facilitate mating with a like connector.

Therefore, a need exists for an approach of measuring the alignment among disparate elements on the surface of a molded optical component. The present invention fulfills this need among others.

SUMMARY OF INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention provides an approach of measuring the alignment among disparate elements on the surface of a molded optical component. To this end, the invention involves a molded optical component (e.g., a ferrule) having a certain optical element (e.g., a lens), an alignment element, and an inspection element, which is readily imaged and is located in a fixed position relative to the alignment member. This way, rather than determining the accuracy of the mold by measuring the position of the optical elements with respect to the alignment elements (which can be difficult to do as mentioned above), the present invention provides readily-imaged inspection elements, which function as imaging surrogates for the alignment elements. The readily-imaged inspection elements provide a clear indication of their position, and hence the position of the alignment members, relative to the optical elements.

In one embodiment, the inspection elements are physically the same or similar to the optical elements, but are not intended to function as an optical element or otherwise interfere with the function of the molded component. Applicant recognized that optical elements tend to be clearly defined, such that a visual measurement can be made very accurately. For example, a convex lens in a molded part is created by a mold insert that has a concave indentation. The concave indentation may be created by diamond turning, for example. The machining operation results in a sharp edge on the mold steel, with essentially no fillet. Since the concave indentation is relatively shallow, this element fills well, resulting in a sharp edge on the molded part. Thus, the edges of lenses can be determined clearly by a visual measurement.

In one embodiment, the present invention exploits the fact that optical elements, such as lenses, are more readily resolved by visual measurement than a pin or a hole by adding similar elements to an alignment pin or hole. This facilitates a precise inspection of the part, since systematic errors, such as those caused by illumination of the sample, affect all elements equally and therefore cancel out when a relative measurement between the pin, hole, and lenses is made. Providing a molded part that is more readily inspected enables the mold to be more precisely tuned, resulting, in turn, in better molded product.

Accordingly, one aspect of the invention is a molded component comprising optical elements, alignment elements, and inspection elements. In one embodiment, the molded component comprises: (a) a body portion defining a first face; (b) at least one optical element on said first face, said optical element having a certain geometry; (c) at least one alignment element on said first face selected from one of an alignment hole or an alignment pin; and (d) at least one inspection element in a position fixed relative to said at least one alignment element on said first face.

Another aspect of the invention is a process of tuning a mold for an optical component by comparing the location of optical elements to inspection elements, rather than the alignment elements. In one embodiment, the process comprises: (a) molding an component comprising at least: (i) a body portion defining a first face; (ii) at least one optical element on said first face, said optical element having a certain geometry; (iii) at least one alignment element on said first face selected from one of an alignment hole or an alignment pin; and (iv) at least one inspection element in a position fixed relative to said at least one alignment element on said first face; (b) measuring the location of said inspection element on said front face relative to said optical element; (c) comparing said location to a standard to determine a difference; and (d) if said difference is significant, adjusting a component of said mold to change said location of said alignment element relative to said optical element and reiterating steps (a)-(c).

DETAILED DESCRIPTION

Figure 1:
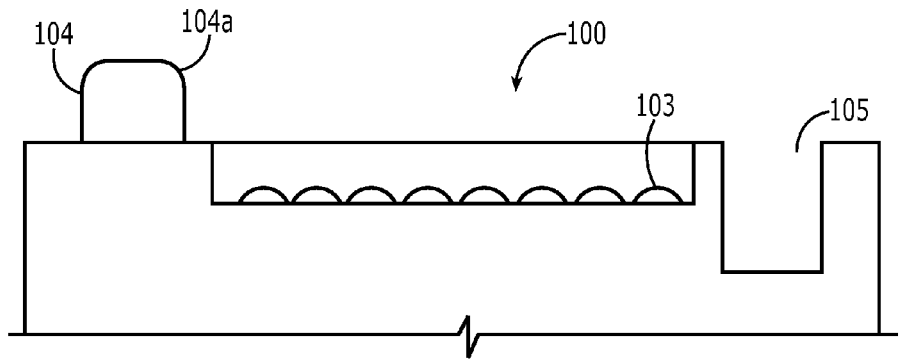
FIG. 1 A hermaphroditic lensed ferrule, shown in cross-section.
Figure 2:
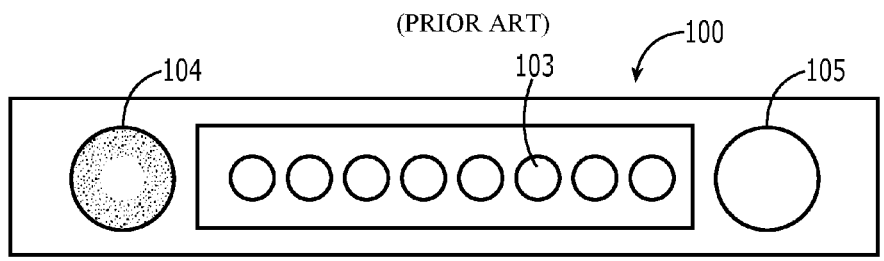
FIG. 2 Top view of the hermaphroditic lensed connector shown in FIG. 1.
Figure 3:
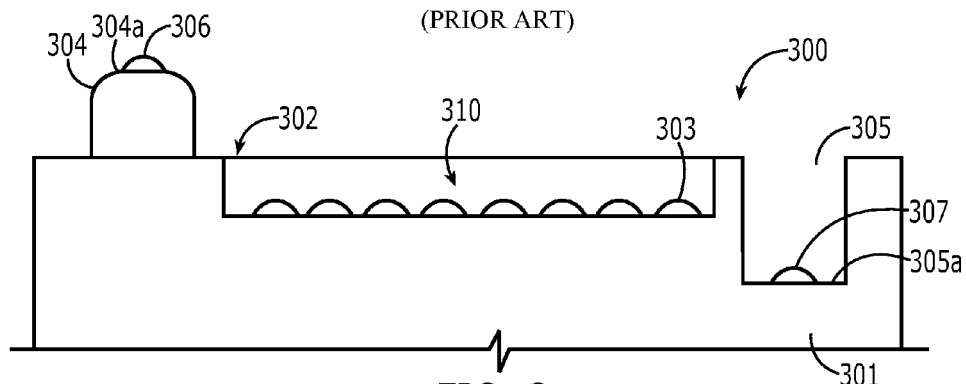
FIG. 3 A hermaphroditic lensed ferrule, as in FIG. 1, with alignment elements added.
Figure 4:
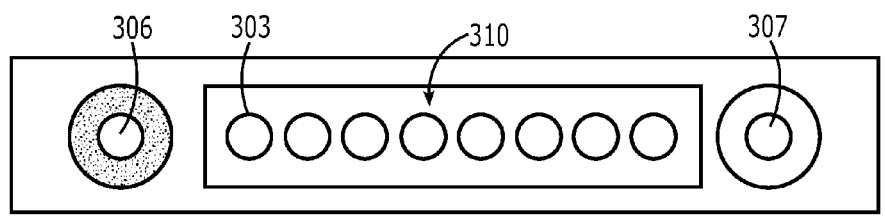
FIG. 4 Top view of the hermaphroditic lensed connector shown in FIG. 3.

Referring to FIGS. 3 and 4, a preferred embodiment of the molded component 300 of the present invention is shown. The molded component 300 comprises a body portion 301 defining a first face 302; (b) at least optical element 303 on said first face 302, said optical element having a certain geometry; (c) at least one alignment element 304, 305 on said first face 302 selected from one of an alignment hole or an alignment pin; and (d) at least one inspection element 306, 307 in a position fixed relative to said at least one alignment element 304, 305 on said first face.

The molded component 300 facilitates a method of tuning the mold that forms it, thereby producing more accurate molded product in an iterative process. In one embodiment, the method comprises: (a) molding an optical component 300 comprising at least a body portion 301 defining a first face 302; at least one optical element 303 on said first face, said optical element having a certain geometry; at least one alignment element 304, 305 on said first face selected from one of an alignment hole or an alignment pin; and at least one inspection element 306, 307 in a position fixed relative to said at least one alignment element 304, 305 on said first face; (b) measuring the location of said inspection element 306, 307 on said front face relative to said optical element 303; (c) comparing said location to a standard to determine a difference; and (d) if said difference is significant, adjusting a component of said mold to change said location of said alignment element relative to said optical element and reiterating steps (a)-(c).

The molded component and the method of tuning the mold for forming the molded product are discussed in greater detail below. Although the molded component illustrated herein relates to a hermaphroditic lensed ferrule, it should be understood that the molded component is not restricted to such an embodiment. For example, the molded component may be a non-hermaphroditic ferrule, an optical interface for optically coupling active devices, a lens block for coupling optical fibers to an active device. The present invention is also applicable to a ferrule which is intended to hold fibers (such as a standard MT ferruel) but which has molded alignment features.

The body portion 301 may be formed of any material that is suitable for interengaging with other optical components. In one embodiment, the body is formed with optically transparent material such that optical elements, such as lenses and light turning facets may be molded directly into the body. Suitable optical transparent materials include, for example, polyetherimide (PEI), polyethersulfone (PES) or polycarbonate. Alternatively, in one embodiment, the body is molded from material that is not optically transparent. Suitable materials include, for example, glass-filled resins such as polyphenylene sulfide (PPS). In such an embodiment, cavities may be molded into the body to receive the optical elements described below. Still other embodiment of the body will be known to those of skill in the art in light of this disclosure.

The optical element 303 may be any element that affects the transmission of light. Such optical elements include, for example, lenses, reflective surfaces, prisms, splitters, combiners, filters, and holes to receive optical fibers. As mentioned above, the optical element may be molded directly into the body, or, alternatively, the optical element may be a discrete component that is prepared separately and inserted into a receiving cavity molded into the body. Additionally, it should be understood that different optical elements may be mixed and matched in the molded component. Still other embodiment of the optical elements may be obvious to one of skill in the art in light of this disclosure. In the embodiment shown in FIG. 3, the optical element comprises a plurality of convex lenses 303 which are arranged in an array 310 below the first face 302.

The alignment elements are well known mechanical elements to facilitate alignment between two optical components. In one embodiment, the alignment elements comprise an alignment pin, an alignment hole for receiving the alignment pin, or a combination of both. Examples of other alignment elements include oblong hole (for receiving a pin without over-constraining the pin/hole distance), and rounded protrusion and rounded/faceted alignment well. In the embodiment shown in FIG. 3, the alignment elements 304, 305 comprise an alignment pin and an alignment hole, respectively. Because the molded component 300 comprises both an alignment pin and an alignment hole configured on either end of the first face 302, the optical component 300 is hermaphroditic, meaning it can mechanically interengage with a component having a similar configuration. Such hermaphroditic configurations are known.

The inspection element may be any physical marking on the first face of the molded component that is clear and visible under the same imaging conditions used to inspect the optical elements. In one embodiment, the inspection element has essentially the same geometry as the optical element. By molding the inspection element with a similar geometry to that of the optical elements, systematic imaging errors caused by shadows and other illumination effects will be cancelled or significantly neutralized. For example, if the optical element is a lens having a certain diameter and radius of curvature, than the inspection elements will have essentially the same diameter and radius of curvature. In this respect, Applicant recognizes that certain elements can be molded with an edge that is clearly defined, such that a visual measurement can be made very accurately. For example, a convex lens in a molded part is created by a mold insert that has a concave indentation. The concave indentation may be created by diamond turning, for example. The machining operation results in a sharp edge on the mold steel, with essentially no fillet. Since the concave indentation is relatively shallow, this element fills well, resulting in a sharp edge on the molded part. Thus, the edges of lenses can be determined clearly by a visual measurement, whereas the edges of a pin or hole often cannot.

It should also be appreciated that while having the geometry of the inspection and optical elements be essentially the same or similar is beneficial, the geometries need not be the same. Accordingly, as used herein, the term "about the same" or "essentially the same" do not mean the geometries are exactly the same but rather that they are essentially the same from an imaging standpoint, meaning that there are no significant differences in the systematic illumination errors such as shadows, halos, or other artifacts between the two geometries. One of skill in the art can readily determine the required similarly between the geometry of the optical and inspection elements before the difference in illumination errors becomes significant. Furthermore, it should be understood that although similar geometries are beneficial, they are not required. For example, the inspection element may be very simple, such as a scratch in the part that is deliberately created with a known relationship to the mechanical alignment element.

An important aspect of the present invention is the location of the inspection elements relative to the alignment element since the purpose of the inspection elements is to precisely identify the locations of the mechanical alignment elements. It is therefore desirable, although not necessary, that the inspection elements be created by techniques that inherently result in their alignment to the mechanical alignment elements. For example, if a mold insert consists of a pin (to create a blind hole in the molded part), then an inspection element may be defined on the mold insert. This way, when the alignment element is molded, the inspection element will necessarily be in a fixed location relative to it.

In one embodiment, the inspection element is integral with the alignment element. For example, if the mold insert comprises a pin to define an alignment hole in the molded component, then the inspection element may be added to the end of the pin as the pin is centerlessly ground or turned on a lathe. If a mold insert consists of a hole (to create a pin in the molded part), then the inspection element may be added to the tool that creates the hole, such that the hole and inspection element are created with the same drilling or milling operation. In one embodiment, the mold steel is inspected to determine the precise location of the inspection feature relative to the alignment feature. Although these dimensions may be difficult to measure on the part, they can be measured more easily on the mold itself.

Although incorporating the inspection element into the alignment element has certain advantages, it is not required. For example, it is possible to precisely fixture the mold steel such that the inspection element can be located at a known position with respect to the mechanical alignment element.

Referring to FIGS. 3 and 4, one embodiment of the molded component 300 of the present invention is shown in which first and second inspection elements 306, 307 are disposed on the top surface 304a of the alignment element 304 (an alignment pin) and the bottom surface 305a of the alignment element 305 (an alignment hole). The first and second inspection elements 306, 307 have a geometry essentially the same as that of the optical elements 303, which, in this embodiment, are lenses as described above.

When the first face 302 of the component 300 is viewed head-on as shown in FIG. 4, the visual image of the inspection elements 306, 307 is essentially the same as that of the optical elements 303. This facilitates a precise inspection of the part, since systematic errors, such as those caused by illumination of the sample, affect all elements equally and therefore cancel out when a relative measurement between the pin, hole, and lenses is made. Adding inspection elements, such as shown in FIG. 3 facilitates an accurate visual measurement of the component 300, but does not affect the normal function of the part.

Once the molded part is inspected, the location of the inspection elements relative to the optical elements can be compared to a standard or specification. If the difference in the relative location is significant between the molded component and the specification (and hence the misalignment of the alignment elements relative to the optical elements is significant), then the mold insert corresponding to the inspection element (and hence the alignment element) may be adjusted to reduce the difference until an acceptable product is molded. At this point, the mold is ready to be placed into service.

It should be understood that the description above provides illustrative embodiments of the present invention and other embodiments exist.

What is claimed is:

1. A molded component comprising:
a body portion defining a first face;
at least one optical element on said first face, said optical element having a first geometry;
at least one alignment element on said first face selected from one of an alignment hole or an alignment pin; and
at least one inspection element disposed on said at least one alignment element on said first face, wherein said at least one inspection element is positioned in a fixed location relative to said at least one alignment element.

2. The component of claim 1, wherein said inspection element has a second geometry about the same as said first geometry of said optical element.

3. The component of claim 2, wherein said optical element is a lens.

4. The component of claim 3, wherein said first geometry comprises a convex surface of a first diameter and a first radius of curvature.

5. The component of claim 1, wherein said at least one optical element comprises a plurality of lenses.

6. The component of claim 5, wherein said lenses are recessed from said first face.

7. The component of claim 1, wherein said molded component is a ferrule.

8. The component of claim 1, wherein said alignment hole comprises a bottom surface with said inspection element defined thereon, and said alignment pin comprises a top surface having said inspection element defined thereon.

9. The component of claim 8, wherein said at least one alignment element comprises said alignment hole and said alignment pin.

10. The component of claim 9, wherein said at least one inspection element comprises first and second inspection elements, and wherein said alignment pin comprises a top surface with said first inspection element defined thereon, and said alignment hole comprises a bottom surface having said second inspection element defined thereon.

11. The component of claim 10, wherein said first and second inspection elements are disposed in the center of said top and bottom surfaces, respectively.

12. A method of tuning a mold for an optical component, said method comprising:
  (a) molding an optical component comprising at least:
    a body portion defining a first face;
    at least one optical element on said first face, said optical element having a first geometry;
    at least one alignment element on said first face selected from one of an alignment hole or an alignment pin; and
    at least one inspection element disposed on said at least one alignment element on said first face, wherein said at least one inspection element is positioned in a fixed location relative to said at least one alignment element;
  (b) measuring the location of said inspection element on said front face relative to said optical element;
  (c) comparing said location to a standard to determine a difference; and
  (d) if said difference is significant, adjusting a component of said mold to change said location of said alignment element relative to said optical element and reiterating steps (a)-(c).

13. The method of claim 12, wherein said mold comprises a plurality of components, a first component defines said optical element, a second component different from said first component, defines said alignment element and said inspection element, and wherein in step (d), adjusting said component, comprises moving said first and second components relative to each other.

14. The method of claim 12, wherein said inspection element has a second geometry about same as said first geometry of said optical element.

15. The method of claim 14, wherein said optical element is a lens.

16. The method of claim 15, wherein said at least one optical element comprises a plurality of lenses.

17. The method of claim 12, wherein said alignment hole comprises a bottom surface with said inspection element defined thereon, and said alignment pin comprises a top surface having said inspection element defined thereon.

18. The method of claim 17, wherein said at least one alignment element comprises said alignment hole and said alignment pin.

19. The method of claim 18, wherein said at least one inspection element comprises first and second inspection elements, and wherein said alignment pin comprises a top surface with said first inspection element defined thereon, and said alignment hole comprises a bottom surface having said second inspection element defined thereon.

20. The method of claim 19, wherein said first and second inspection elements are disposed in the center of said top and bottom surfaces, respectively.

* * * * *